Jan. 23, 1962 D. KALISH 3,017,690
OBJECT INSERTING MACHINE
Filed Dec. 22, 1958 5 Sheets-Sheet 1

INVENTOR.
DAVID KALISH
BY Woodling and Krost,
ATTORNEYS

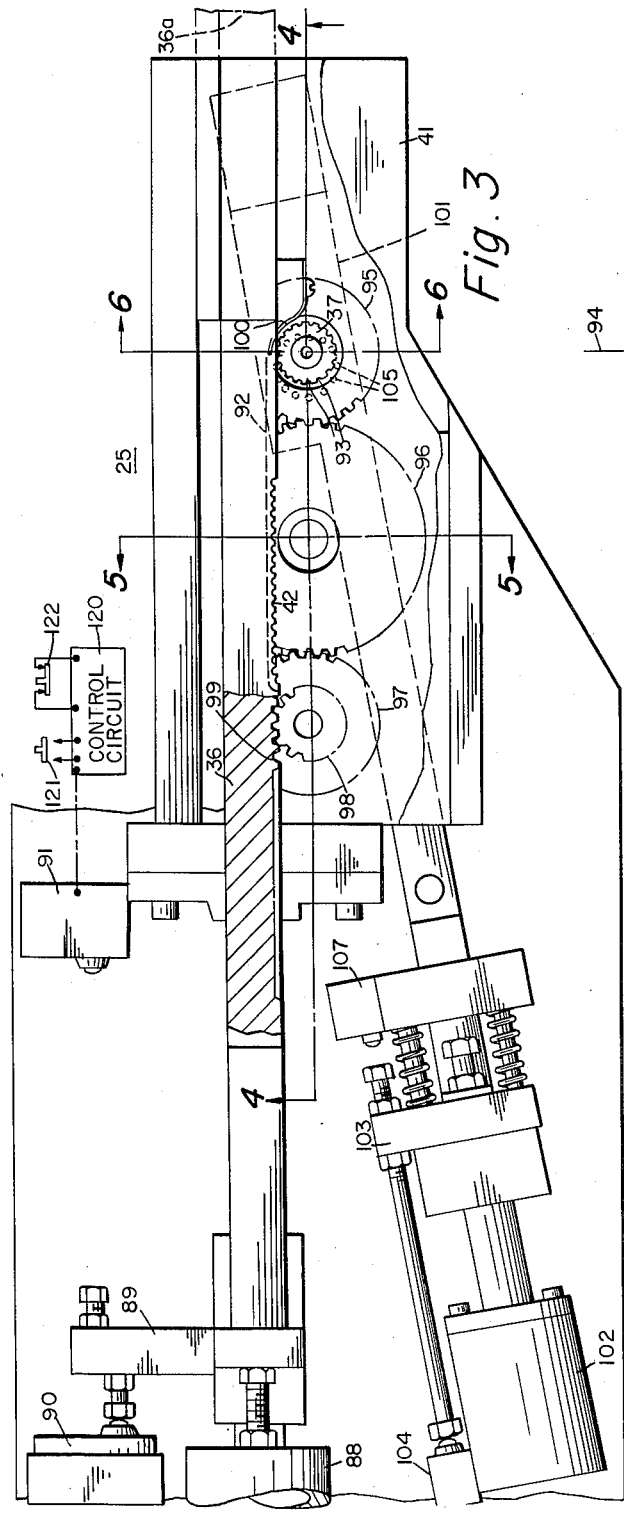
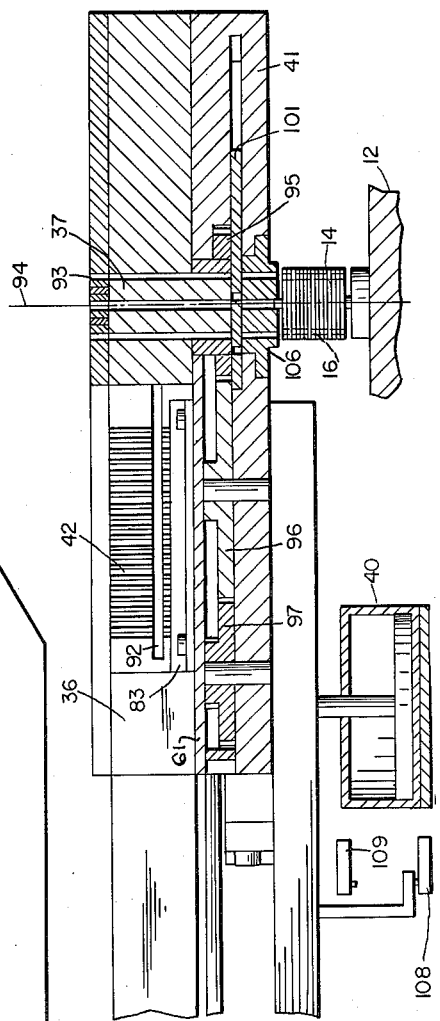

Jan. 23, 1962 D. KALISH 3,017,690
OBJECT INSERTING MACHINE
Filed Dec. 22, 1958 5 Sheets-Sheet 3

INVENTOR.
DAVID KALISH
BY Woodling and Krost,
ATTORNEYS

Jan. 23, 1962 D. KALISH 3,017,690
OBJECT INSERTING MACHINE
Filed Dec. 22, 1958 5 Sheets-Sheet 4

INVENTOR.
DAVID KALISH
BY Woodling and Kroot,
ATTORNEYS

Jan. 23, 1962  D. KALISH  3,017,690
OBJECT INSERTING MACHINE
Filed Dec. 22, 1958  5 Sheets-Sheet 5

INVENTOR.
DAVID KALISH
BY Woodling and Krost,
ATTORNEYS

United States Patent Office 3,017,690
Patented Jan. 23, 1962

3,017,690
OBJECT INSERTING MACHINE
David Kalish, Alliance, Ohio, assignor to Consolidated Electronics Industries Corporation, a corporation of Delaware
Filed Dec. 22, 1958, Ser. No. 782,002
12 Claims. (Cl. 29—205)

The invention relates in general to object inserting machines and particularly, to a machine to insert elongated objects such as pins in a plurality of holes disposed in an annular path with the holes being all generally parallel and disposed about an axis of the receiving device with the objects or pins being moved generally axially of themselves into holes in the receiving device.

In the manufacture of electric motors, for example, especially the subfractional horse power sizes of alternating current induction motors, squirrel cage windings are often employed. In such squirrel cage windings a stack of rotor or stator laminations of magnetic material has a plurality of holes or slots disposed in an annular path or generally circular path, around the periphery in the case of a rotor. The motor can be constructed in reverse fashion; that is, with the squirrel cage assembly on the stator, in which case the stator core is generally not circular, but does have a circular path or series of holes to receive the squirrel cage winding. Such a squirrel cage winding generally consists of a plurality of conductor pins which are disposed generally parallel to the axis of the rotor, or which may be skewed relative to the axis, and these pins join conductor rings or discs on the two ends of the stack of laminations, either rotor or stator, as the case may be.

In subfractional horse power induction motors such a rotor may be in the order of ¾″ to 2″ in diameter with a stack height of from ¼″ to 1½″. In such small sizes the conductor pins become increasingly more difficult to insert into the holes in the aligned core and, accordingly, an object of the invention is to provide a machine for automatic inserting conductor pins in a stack of laminations for constructing a squirrel cage structure.

Another object of the invention is to provide an object dispensing machine which feeds objects into a generally planar disposition, transfers them into an annular path, and then generally axially moves them to insert the objects into a receiver.

Another object of the invention is to provide a pin inserting machine to establish a plurality of pins in a plane and all substantially parallel, then to transfer them into a circular path with the pins remaining parallel, and then to axially insert the pins into holes in a stack of laminations.

Another object of the invention is to provide a pinning machine, wherein the pins are vibrated to cause them to become generally aligned parallel to each other, and then are dispensed through a chute to drop into a gauging device which senses the absence of any pin or which senses a shortened pin.

Another object of the invention is to provide a pinning machine which vibrates the pins to align them parallel to each other in a plane and then transfers them into a circular path with the circular path moving longitudinally to a position whereat the pins may be axially transferred into a receiver.

Another object of the invention is to provide a pinning machine with the pins disposed in a type of rack with a plurality of sockets engaging approximately half the circumference of each pin and with the rack next reciprocatingly transferring the pins to a pinion type magazine which has a plurality of pockets engaging approximately half the circumference of each pin and then the pins are axially transferred from this magazine into a receiver.

Another object of the invention is to provide a pin inserting machine which utilizes the rack and pinion type of mechanism with the pins transferred from the rack to the pinion by a finger disposed adjacent the pinion.

Other objects and a fuller understanding of this invention may be had by referring to the following description and claims, taken in conjunction with the accompanying drawings, in which:

FIGURE 3 is a top view of the pinning station of the machine.

FIGURE 4 is a partial sectional view on the line 4—4 of the FIGURE 3.

Figure 1:
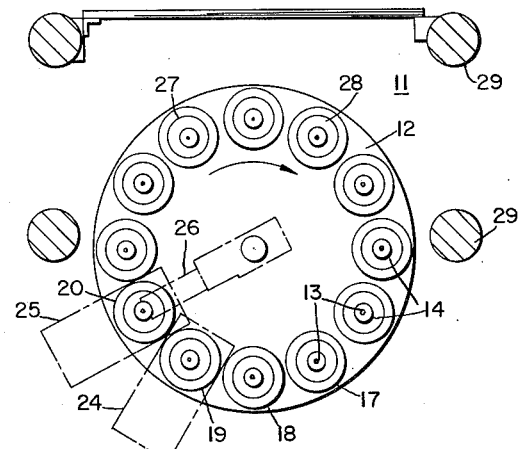
FIGURE 1 is a diagrammatic plan view of the pinning machine embodying the invention.
Figure 2:
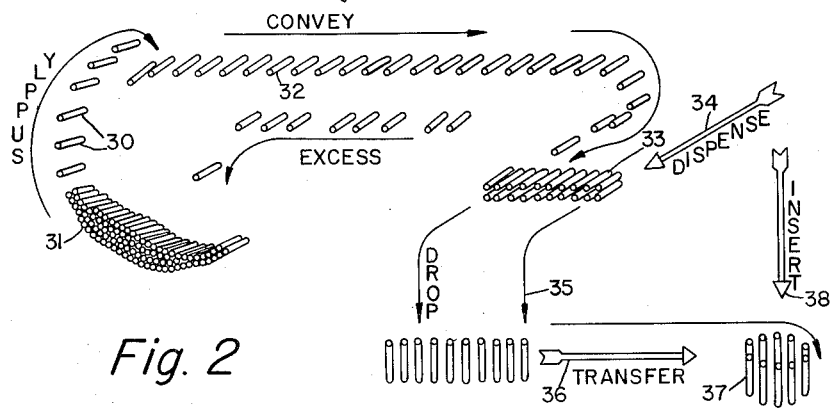
FIGURE 2 is a diagrammatic flow diagram of movement of the pins in the machine.

FIGURE 1 generally shows the entire pinning machine 11 which, for purposes of illustration but not limitation, has been shown as a machine for aligning and pinning together laminations of sheet metal arranged in a stack and with each lamination having a plurality of holes in a circular or annular path. The pinning machine 11 includes generally an indexing table 12 having a plurality of spindles 13 vertically disposed on the table 12. Each of these spindles 13 is adapted to receive a lamination stack 14 at a central aperture 15 thereof, as shown in FIGURE 2. Each lamination stack 14 has a plurality of holes or slots 16 disposed in an annular or circular path.

FIGURE 1 shows that the indexing table 12 has a stack loading or transfer position 17, a shuffler position 18, a line-up position 19 and a pinning position 20. The FIGURE 1 shows that the pinning machine 11 includes a line-up station 24 adapted to cooperate with a stack of laminations at the line-up position 19 of the indexing table 12. Also diagrammatically shown in FIGURE 1, the machine 11 includes a pinning station 25 adapted to cooperate with a lamination stack 14 at the pinning position 20 of the indexing table 12. A stack clamp 26 is diagrammatically shown in FIGURE 1, and this stack clamp cooperates with any stack at the line-up position 19 and arcuately moves with each stack to the pinning position 20.

The line-up station 24 lines up the holes 16 in the stack 14, the pinning station 25 places conductor pins in the aligned holes, the stack clamp 26 releases and returns to the line-up position 19, and then the indexing table 12 indexes to press positions 27 and 28 within a press as shown by the press columns 29 whereat the conductor pins are peened or headed to fasten the stack together, merely one example of use being to construct a squirrel cage induction motor rotor.

FIGURE 2 shows diagrammatically a flow chart for a plurality of pins 30 within the pinning machine 11. The pins 30 are moved from a supply source 31 to a chain conveyor 32 which conveys the pins into a box holder 33 whereat they are aligned transversely and the bottom layer dispensed by a dispenser blade 34 and dropped down a chute 35 into a rack 36. In this rack 36 the pins 30 are aligned in a vertical plane and are then transferred by this rack 36 to a pinion type magazine 37 and from this magazine 37 rod means 38 axially insert the pins into a rotor lamination stack 14 which is the receiving device or receiver.

FIGURES 3 through 11 show the various parts of the mechanism of the pinning station 25 which is shown merely as a dotted rectangle in FIGURE 1.

FIGURE 3 shows generally a plan view of the pinning station 25 within a base plate 41 movable up and down by a reciprocating motor 40, see FIGURE 4, fixedly attached by means not shown to one of the press columns 29. The rack 36 is mounted for longitudinal reciprocating movements on this base plate 41. The rack 36 has a plurality of semi-cylindrical sockets 42 in one side thereof with these sockets disposed in a vertical plane. Eighteen of these sockets have been shown because in the particular lamination stack 14 illustrated, there are eighteen holes and hence eighteen pins are to be dispensed into these holes, yet such number is merely illustrative and is not to be taken as a limitation.

Figure 7:
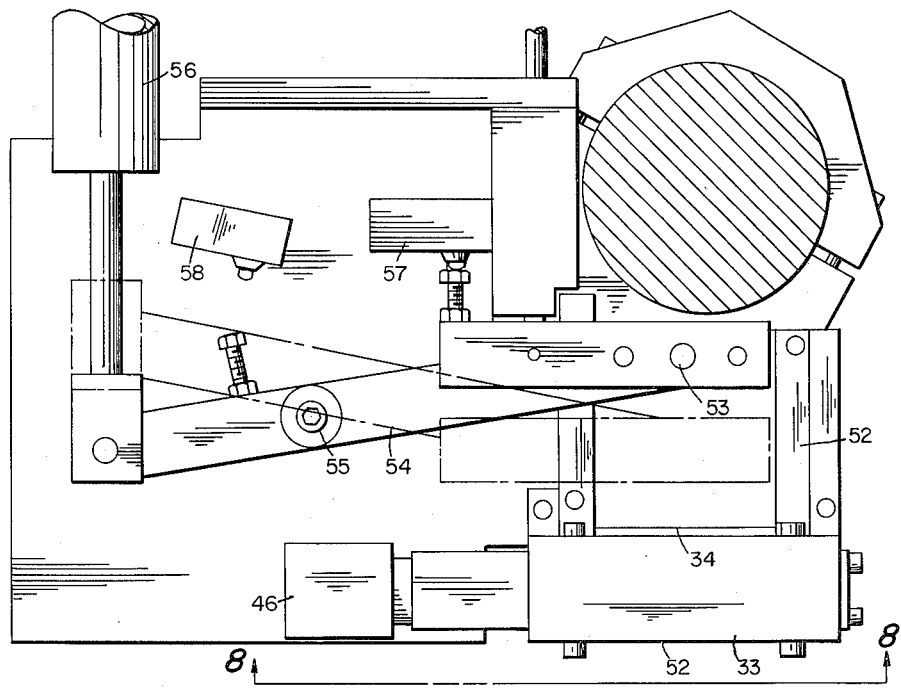
FIGURE 7 is a plan view of the pin feeding mechanism.
Figure 8:
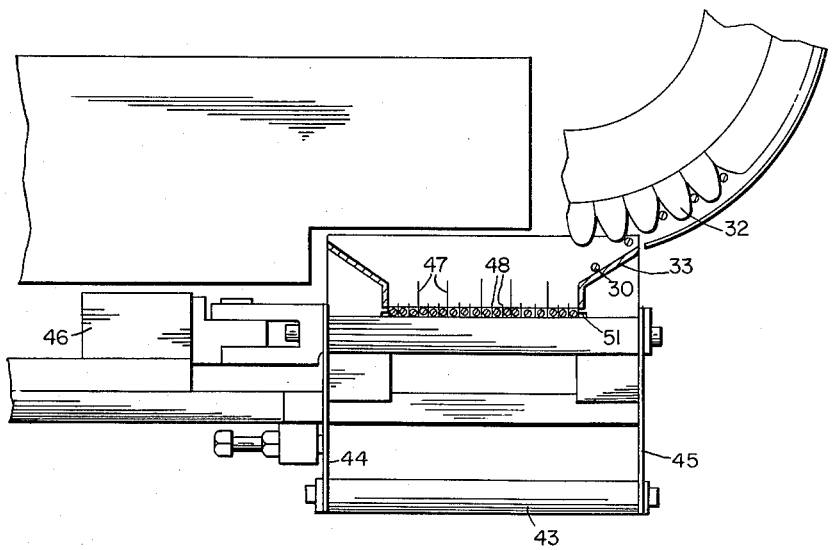
FIGURE 8 is a view on the line 8—8 of FIGURE 7.

The box holder 33 is placed above the rack sockets, as shown in FIGURE 2. FIGURE 8 shows that this box holder 33 is supplied pins 30 by the chain conveyor 32. These pins 30 drop into the top of box holder 33 which is mounted on a stationary bar 43 by leaf springs 44 and 45. These leaf springs 44 and 45 permit movement of the box holder 33 longitudinally of itself by a vibrator 46. FIGURES 7 and 8 show that the vibrator 46 is mounted on a stationary part of the pinning station machine 25 to rapidly and longitudinally reciprocate the box holder 33. The box holder has a first series of transverse divider plates 47 and a second series of transverse divider plates 48. The divider plates are shown as being 17 in number to provide eighteen transverse compartments in the box holder 33. The first series of plates 47 are fewer in number than the second series 48 to align the pins 30 in groups and to help the second series of plates 48 establish one pin per compartment without any of the pins lying crossways of the plates.

The pins 30 lie in the bottom of the box holder 33 and lie adjacent an exit slot 51 in the bottom of one side 52 of the box holder 33. The dispenser blade 34 is mounted in a stationary frame 52 of the machine 11 so as to be reciprocated horizontally into the bottom of box holder 33, and hence to dispense the pins 30 out of the exit slot 51. The dispenser blade 34 is pivotally connected at 53 to an arm 54, in turn pivoted at 55 to the frame of the machine 11. An air cylinder 56 is connected to the arm 54 to move it and the dispenser blade 34. The dispenser blade 34 is shown in FIGURE 7 in the retracted position whereat it actuates a switch 57. When the dispenser blade 34 is moved forwardly into the dispensing position, as shown in dotted lines in FIGURE 7, the arm 54 actuates a switch 58.

Figures 6, 10:
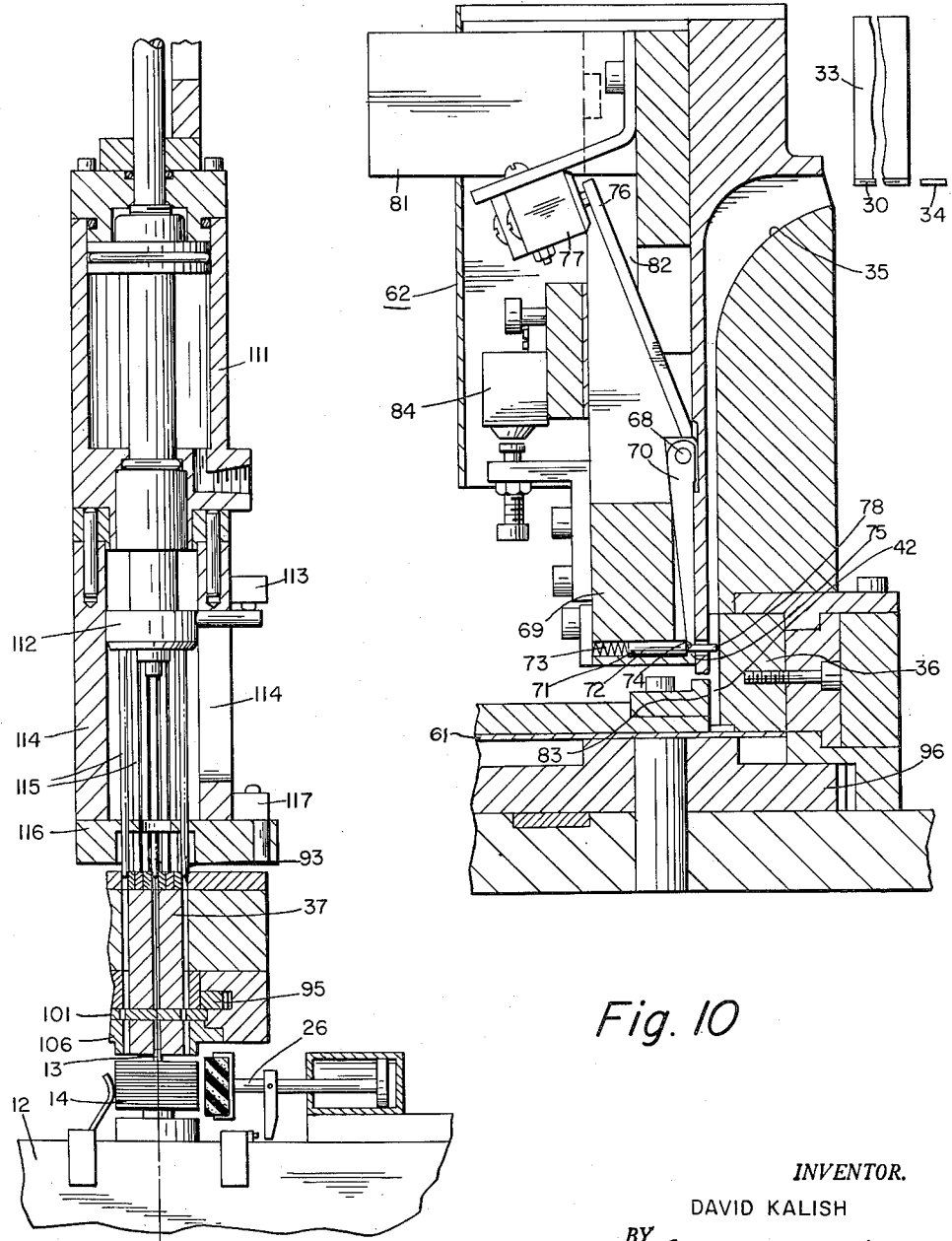
FIGURE 6 is a sectional view on the line 6—6 of FIGURE 3.
FIGURE 10 is a side view of the pin gauging device of FIGURE 9.
Figure 9:
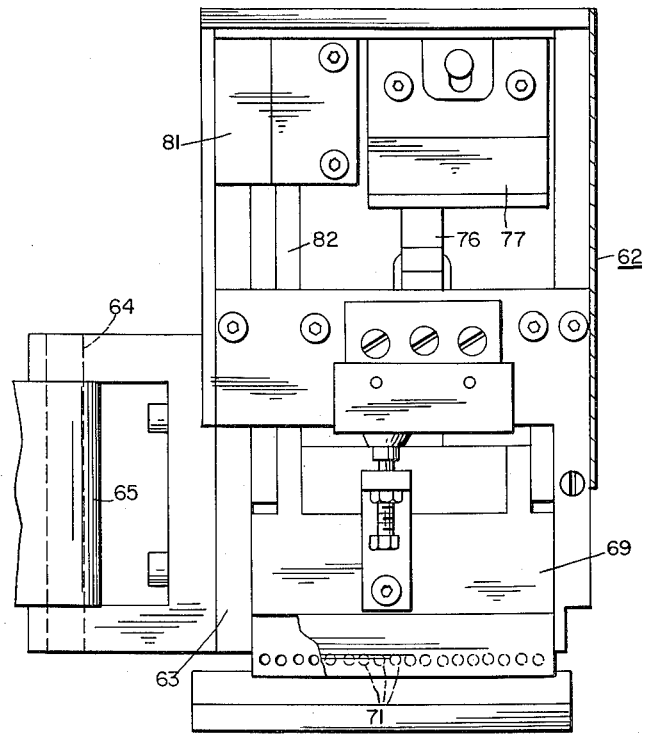
FIGURE 9 is an enlarged front view of the gauging device of the invention.
Figure 11:
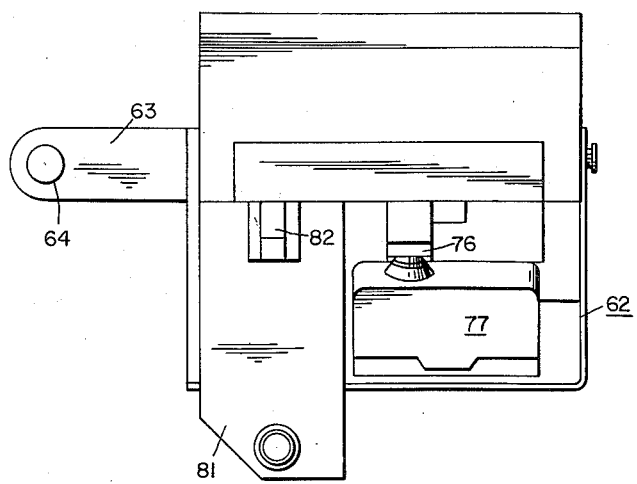
FIGURE 11 is a top view of the gauging device of FIGURE 9.

FIGURE 10 shows fragmentarily the box holder 33 with the plurality of pins 30 in the bottom thereof capable of moving out of the exit slot 51 thereof into the chute 35. This chute has, in this particular example, eighteen grooves therein so as to maintain each pin in a vertical plane as it drops to the bottom of the chute 35 to enter the rack sockets 42 and rest on a support plate 61. The grooves in the chute 35, therefore, assure that there will be one pin dropping into each socket. FIGURES 9, 10, and 11 all generally show a gauging device 62 which is positioned adjacent the chute 35 and adjacent the rack sockets 42. This gauging device 62 includes a frame 63 mounted on a hinge-pin 64 to a part 65 carried on the base plate 41. The gauging device frame 63 carries a horizontal axle 68 which is common pivot for a block 69 and a gauge plate 70. The block 69 has a plurality of cylindrical apertures 71 in a horizontal plane at the bottom of this block 69 and each aperture 71 contains a plunger 72 and has a spring 73 urging the plunger 72 outwardly of the block 69 so that a shoulder 74 on each plunger engages a lip 75 on the block 69. The gauge plate 70 also engages all of the shoulders 74. The upper end 76 of the gauge plate 70 actuates a switch 77 whenever any of the plungers 72 has moved forwardly so that the shoulder 74 engages the lip 75. This is a condition whereat the sensing end 78 of the particular plunger has entered one of the sockets 42 as caused by the absence of a pin 30 in that socket or at least the absence of the top of such a pin.

An air cylinder 81 is connected by a lever 82 to pivot the block 69 about the axle 68. FIGURES 9, 10 and 11 show the block 69 in the forward or gauging position near a planar wall 83 which holds the pins in the sockets, and when the air cylinder 81 actuate the lever 82, this moves the block 69 away from this planar wall 83. In such condition the lip 75 moves the plungers away from the rack sockets 42 a sufficient distance so that the pins 30 may fall down the chute 35 into the rack sockets 42 without interference from the sensing ends 78 of the plungers. This retract movement of the block 69 also moves the gauge plate 70 so that switch 77 is not actuated. When the block 69 is moved backwardly or retracted, a switch 84 is actuated.

The planar wall 83 is spaced from the semi-cylindrical rack sockets 42 a sufficient distance so that it engages one side of the pins 30 and thus retains each pin in its respective socket 42.

Figure 5:
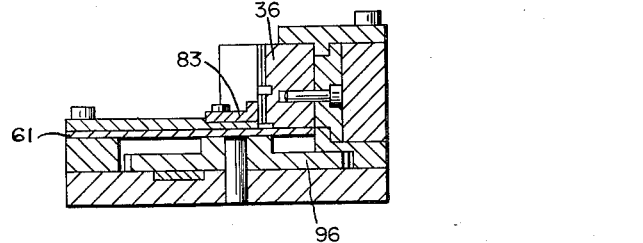
FIGURE 5 is a sectional view on line 5—5 of FIGURE 3.

FIGURES 3, 4, and 5 best show the rack 36 and its associated mechanism. These figures show the rack 36 in its retracted position. The rack is connected to an air cylinder 88 which moves it from this retracted position to an advanced position shown in dotted lines 36A. As shown in FIGURE 3, when the rack 36 is in the retracted position, an arm 89 thereon actuates a switch 90 and when the rack 36 is in the advanced position, this arm 89 actuates a switch 91.

The rack 36, at the rack sockets 42, has a longitudinal groove 92 which cuts through the entire depth of the rack sockets 42 so that the groove is preferably slightly deeper than the depth of these sockets 42. The rotary pinion type magazine 37 has a plurality of semi-cylindrical pockets 93 in a predetermined spacing in an annular or circular path which coincides with the holes 16 in the lamination stack 14. In this case where the machine has been shown with eighteen rack sockets 14, the pinion magazine 37 will have a corresponding number or eighteen pockets 93 with all holes vertical and equally spaced around an axis 94 which is not only the axis of the magazine 37 but also the axis of the lamination stack 14 at the pinning position 20 of the index table 12. The rotary pinion magazine 37 cooperates with the rack 36. The magazine 37 is connected to a first gear 95 meshing with a second gear 96 in turn meshing with a third gear 97. This third gear 97 coaxially carries a fourth gear 98 which meshes with rack teeth 99 on the rack 36. The gearing 95—98 has an appropriate ratio so that gear 98 makes one complete revolution as the magazine 37 makes one complete revolution and the rack sockets 42 and the magazine pockets 93 move past each other at the same surface speed and in phase synchronism.

The pinion magazine 37 is journaled on the base plate 41 and a finger 100, best seen in FIGURE 3, is mounted close to this magazine 37, and its forward end extends into the longitudinal groove 92. Thus when the rack 36 is longitudinally reciprocated past the pinion magazine 37, the finger 100, since it extends into the groove 92, moves the pins out of the rack sockets 42 into the magazine pockets 93. The pins 30 will therefore drop down in the magazine 37 until they rest upon a holding plate 101. This holding plate is mounted for longitudinal reciprocation on the base plate 41 by means of an air cylinder 102. When the base plate 41 is in the lower position, a switch 108 is actuated, and when in the upper position as moved by motor 40, a switch 109 is actuated.

FIGURES 3 and 4 show the holding plate 101 in the retracted position whereat an arm 103 actuates a switch 104. The holding plate 101 has a series of apertures 105 arranged in an annular path coinciding with the annular path of holes 16 in the lamination stack 14. With the air cylinder 102 retracted as shown in FIGURE 3 the apertures 105 are not aligned with the magazine 37. However, when the air cylinder 102 moves to an advanced position these apertures 105 are aligned with the holes 16 in the stack 14 to permit the pins 30 in the magazine 37 to drop downwardly through an alignment fixture 106 to the stack 14. When the air cylinder 102 is in the advanced position the arm 103 actuates switch 107.

The pinning station 25 includes an air cylinder 111 correspondingly mounted on the axis 94. FIGURE 6 shows the cylinder in the retracted position wherein it moves a supporting pad 112 to the upward or retracted position whereat it actuates a switch 113. This supporting pad 112 is mounted for vertical reciprocation in guides 114 and carries a plurality of push rods 115. These rods are disposed on an annular path, in this case a circular path, with eighteen rods being shown in this example to push the pins 30 out of the alignment fixture 106 into the holes 16 in the stack 14. The rods 115 extend through a guide plate 116 to maintain the rods vertical in their reciprocation. When the supporting pad 112 moves downwardly to its lower limit it actuates a switch 117 and the travel of the push rods 115 is sufficient to push the pins 30 downwardly completely through the holes 16 in the stack 14.

FIGURE 3 shows diagrammatically a control circuit 120 to which the switches of the system may be wired and also includes a start switch 121 and a stop switch 122 connected to this control circuit 120.

Operation

When the start button 121, FIGURE 3, is depressed, the control circuit 120 causes the conveyor 32 to start continuous movement to convey pins 30 into the box holder 33. This maintains the box holder 33 continuously full and any excess may return to the supply source 31. This start button 121 also starts the vibrator 46 so that the box holder 33 is longitudinally vibrated to help align the pins parallel and transversely of the box 33. This function is aided by the series of divider plates 47 and 48 which establish one pin for each compartment between the plate 48. It is assumed that a lamination stack 14 is at the pinning position 20 of the indexing table 12 as shown in FIGURES 1, 4 and 6. This stack 14 has the holes 16 thereof aligned so as to be capable of receiving the pins 30.

The blade 34 is normally in the forward position to keep pins in the holder 33 when the pinning operation starts. The rack 36 is in the retracted position as shown in FIGURES 3 and 4. This means that arm 89 has actuated the switch 90. With this switch 90 actuated as well as the start button 121, the air cylinder 56 is caused to move forwardly to move the dispenser blade 34 rearwardly. This actuates switch 57 causing cylinder 56 to move the blade 34 forwardly. This pushes eighteen pins out of the bottom of the box holder 33 into the curved chute 35, see FIGURE 10. Previous to this time the block 69 is pivoted rearwardly away from the chute 35 by the air cylinder 81 so that the plungers 72 are retracted out of the way of the dropping pins. Accordingly, the pins 30 drop into the rack sockets 42. After the dispenser blade 34 reaches its forward limitation and hence after all eighteen pins have been dispensed, the arm 54 actuates switch 58. This switch actuates a time delay relay to give time for the pins to fall, and then causes air cylinder 81 to move forwardly the block 69 of the gauging device 62. When the block 69 moves forwardly, each of the eighteen plungers 72 attempts to enter the associated rack socket 42. The sensing end 78 of each plunger however is stopped by a pin 30 in each of these sockets, and the plungers are not moved forwardly as far as shown in FIGURE 10, accordingly, the gauge plate 70 does not actuate the safety switch 77. If any one of the eighteen pins 30 should be absent, or if a particular pin is not long enough so that the top of it engages its associated plunger, then the shoulder 74 will move forwardly to pivot the gauge plate 70 and hence the safety switch 77 will be actuated. This stops the cycle of operation at this point and hence prevents incomplete pinning of a lamination stack 14. The gauging device 62 is mounted on the hinge pin 64 so that the entire gauging device may be swung out of the way and therefore an operator can insert a pin in the empty socket or replace a short pin with one of proper length, should this be the cause of the trouble. When the gauging device 62 is swung back into position the safety switch 77 will no longer be actuated so that the cycle of operation may again be continued by again depressing the start switch 121. The previous actuation of the switch 58 causes, after the time delay, the air cylinder 81 to retract the block 69 so that the plungers 72 no longer press against the pins 30. This also prepares the gauging device 62 for the succeeding cycle.

When the block 69 is retracted switch 84 is actuated. This controls air cylinder 88 to move the rack 36 forwardly. Switch 104 is interlocked with this movement and since switch 104 is actuated at this time this permits air cylinder 88 to move forwardly. The forward movement of rack 36 acting through the gearing 95—99 transfers the pins from the rack sockets 42 to the magazine pockets 93. The finger 100 causes this transfer of pins to the magazine pockets 93. At the end of the advance movement of the rack 36 the switch 91 is actuated and this causes air cylinder 102 to move forwardly such that the holding plate apertures 105 are aligned with the magazine pockets 93 and with the holes in the alignment fixture 106 and the lamination stack 14. At the completion of the forward movement of air cylinder 102 switch 107 is actuated. This causes the base plate 41 to move downwardly so that alignment fixture 106 is very close to the stack 14, as shown in FIGURE 4. This actuates switch 108 to cause air cylinder 111 to move downwardly and hence, the push rods 115 push the pins 30 out of the magazine pockets 37 or alignment fixture 106, wherever they may be, into the holes 16 in the lamination stack 14. This lamination stack by its very nature may have the holes thereof slightly rough on the inside because of the junction of the various laminations in the stack. Also the conductor pins 30 may have some slight burrs on the ends thereof caused by the cut-off machine which cuts these pins into a predetermined length. Consequently, the air cylinder 111 should have sufficient force to make certain that the pins 30 are pushed completely into the lamination stack 14. An air cylinder 111 of a force of about 200 to 300 pounds has been found to be adequate for these eighteen pins to be pushed into a lamination stack made of about 25 separate laminations with a diameter of about one inch.

When the cylinder 111 has bottomed, which assures that all pins are in place in the stack 14, the switch 117 will be actuated. This causes retractile movement of the cylinder 111. When it reaches its uppermost limit the switch 113 is actuated. This actuates motor 40 to raise the base plate 41 for a safe clearance above spindle 13, so that the table 12 may index. The elevation of base plate 41 actuates switch 109, and this causes several things to happen; first, the stack clamp 26 as shown in FIGURE 1 may be radially retracted; second, the table 12 indexes; third, the air cylinder 102 retracts and fourth, the air cylinder 88 retracts. In the first of these functions, the retraction of the stack clamp 26 permits it to move radially away from the lamination stack 14 and then to move arcuately to be aligned with the line-up position 19. It is then in position to move radially outward into engagement with a stack 14 at the lineup position 19 so that it will hold this stack with the holes thereof in alignment as the indexing table 12 and the stack clamp 26 next arcuately move from the line-up position 19 to the pinning position 20. Accordingly, this movement of the stack clamp 26 and the indexing of the indexing table 12 brings a newly aligned stack 14 to the pinning position 20 for the next succeeding cycle. As to the third of the above-mentioned functions, the cylinder 102 retracts so that the holding plate apertures 105 are out of registry with the magazine pockets 93 and, therefore, in the succeeding cycle the pins 30 will not prematurely drop past the holding plate 101.

Retraction of cylinder 102 actuates switch 104 which is an interlock switch and this switch must be actuated before the rack 36 may again move forwardly to transfer pins into the magazine 37.

As to the fourth of the above functions, the air cylinder 88 retracts to the position shown in FIGURES 3 and 4 at which position the switch 90 is actuated and accordingly, the complete cycle automatically repeats unless there is no new stack 14 at the pinning position 20 or unless the stop button 122 is depressed.

The conveyor 32, the box holder 33 and the chute 35 are a feed means to establish a plurality of pins 30 in the rack sockets 42 and, hence, establish these pins substantially in a plane, which in this case is shown as being vertical.

The cylinder 88 is a means to establish relative reciprocation of the rack 36 and the magazine 37 so that the pins 30 are transferred from the rack sockets 42 to the magazine pockets 93.

The cylinder 102 is a means to establish relative reciprocation of the holding plate 101 and the magazine 37 so that the apertures 105 are axially aligned with the respective magazine pockets 93.

The rack 36 may be considered to be a first holder for pins or objects which are disposed essentially in a plane, and the magazine 37 may be considered to be a second holder which has a plurality of pockets disposed essentially on a circle or on an annular path so that the pins may be substantially axially transferred from this second holder or magazine into the receiver, which in this case is the lamination stack 14.

The sockets 42 on the rack 36 have a predetermined spacing, dependent on the desired spacing in the stack 14, and of course the same spacing is used for the magazine pockets 93. In the embodiment shown, this spacing is equal.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine to insert a plurality of objects into a plurality of holes in a receiver, comprising, in combination, means on said machine for carrying a receiver having an axis and having a plurality of holes disposed in a first annular path around said axis, a rack having a plurality of sockets, feed means to establish a plurality of objects in said sockets with said sockets encompassing approximately half of the respective objects, a rotary magazine cooperating with said rack and having a plurality of pockets disposed in a second annular path substantially identical to said first annular path, power means to relatively reciprocate said rack and said magazine from a retract position to an advanced position to move said objects out of said rack sockets into said magazine pockets with said pockets encompassing approximately half of the respective objects, said pockets and said receiver holes alignable on an axis substantially parallel to said receiver axis, and means to axially transfer said objects out of said magazine pockets into said receiver holes.

2. A pinning machine to insert pins in a plurality of aligned holes in a first annular path in a stack of laminations comprising, in combination, means on said machine for carrying a stack of laminations, a rack having a plurality of semi-cylindrical sockets, feed means to establish a plurality of pins in said sockets, a rotary magazine cooperating with said rack and having a plurality of semi-cylindrical pockets disposed in a second annular path substantially identical to said first annular path, power means to relatively reciprocate said rack and said magazine from a retract position to an advanced position to move said pins out of said rack sockets into said magazine pockets, said pockets being axially alignable with respective holes in said lamination stack, and means to axially transfer said pins out of said magazine pockets into said holes in said stack of laminations.

3. A pinning machine to insert pins in a plurality of holes disposed in a circle in a receiver comprising, in combination, means on said machine for carrying a receiver having an axis and having said holes substantially axially parallel, a first holder having semi-cylindrical sockets disposed essentially in a plane, feed means for supplying a plurality of pins in said sockets, a second holder having a plurality of semi-cylindrical pockets disposed essentially on a circle and substantially axially parallel to the sockets in said first holder, means to transfer said pins from said first holder sockets to said second holder pockets, and means to substantially axially transfer said pins from said second holder pockets to said holes in said receiver.

4. A pinning machine to insert pins in a plurality of aligned holes in a first annular path in a stack of laminations comprising, in combination, means on said machine for carrying a stack of laminations, a rack having a plurality of semi-cylindrical sockets, feed means to establish a plurality of pins in said sockets, a rotary magazine cooperating with said rack and having a plurality of semi-cylindrical pockets disposed in a second annular path substantially identical to said first annular path, first power means to relatively reciprocate said rack and said magazine from a retract position to an advanced position to move said pins out of said rack sockets into said magazine pockets, said pockets being axially alignable with respective holes in said lamination stack, a plurality of long rods axially parallel with said magazine pockets on one axial end of said magazine, and second power means to axially advance said rods to push said pins out of said magazine pockets into said holes in said stack of laminations.

5. A pinning machine to insert pins in a plurality of aligned holes in a first annular path in a stack of laminations comprising, in combination, means on said machine for carrying a stack of laminations, a rack having a plurality of semi-cylindrical sockets essentially disposed in a plane, feed means to establish a plurality of pins in said sockets, a rotary magazine cooperating with said rack and having a plurality of semi-cylindrical pockets disposed in a second annular path substantially identical to said first annular path, a central longitudinal groove in said rack cutting through the entire depth of said rack sockets, a finger adjacent said magazine and disposed in said groove, first power means to relatively reciprocate said rack and said magazine from a retract position to an advanced position with said finger moving said pins out of said rack sockets into said magazine pockets, said pockets being axially alignable with respective holes in said lamination stack, a plurality of long rods axially parallel with said magazine pockets on one axial end of said magazine, second power means to relatively axially move said magazine and said stack to bring said magazine and stack close together, and third power means to axially advance said rods to push said pins out of said magazine pockets into said holes in said stack of laminations.

6. A pinning machine to insert pins in a plurality of aligned holes in a first annular path in a stack of laminations comprising, in combination, means on said machine for carrying said stack of laminations, transverse divider plates establishing a plurality of compartments in a plane for said pins, a rack having a plurality of semi-cylindrical sockets, means to effectuate movement of said pins from said compartments into said rack sockets, a rotary magazine cooperating with said rack and having a plurality of semi-cylindrical pockets disposed in a second annular path substantially identical to said first annular path, gearing interconnecting said rack and magazine for equal surface speed, a central longitudinal groove in said rack cutting through the entire depth of said rack sockets, a finger adjacent said magazine and disposed in said groove to move said pins out of said sockets on said rack into said pockets on said magazine as said rack and magazine relatively reciprocate from a retract to an advanced position, said pockets being axially alignable with respective holes in said lamination stack, a plurality of long rods axially parallel with said magazine pockets on one axial end of said magazine, a plate adjacent the other axial end of said magazine to retain said pins therein, a plurality of apertures in an annular path in said plate, power means to relatively reciprocate said rack and said magazine from a retract postion to an advanced position and connected to relatively transversely move said plate and said magazine from a closed to an open position whereat said plate apertures are aligned with said magazine pockets, second power means to axially move said magazine close to said stack, and third power means to axially advance said rods to push said pins out of said magazine pockets into said holes in said stack of laminations.

7. A pinning machine to insert pins in a plurality of aligned holes in a stack of laminations comprising, in combination, a central spindle on said machine for carrying said stack of laminations, a box holder for carrying a plurality of pins, transverse divider plates in the bottom of said box holder establishing a plurality of compartments for said pins, a rack having a plurality of semi-cylindrical sockets, means to effectuate movement of said pins out of the bottom of said box holder into said rack sockets, a pinion cooperating with said rack and having a plurality of semi-cylindrical pockets, gearing interconnecting said rack and pinion for equal surface speed, means to move said pins out of said sockets on said rack into said pockets on said pinion as said rack and pinion relatively reciprocate from a retract to an advanced position, said pinion having said pockets on the same bolt circle diameter as the bolt circle diameter of the plurality of holes in said stack of laminations, said pockets being axially alignable with respective holes in said lamination stack, a plurality of long rods axially parallel with said pinion pockets on one axial end of said pinion, power means to relatively reciprocate said rack and said pinion from a retract position to an advanced position and second power means to axially advance said rods to push said pins out of said pinion pockets into said holes in said stack of laminations.

8. A pinning machine to insert pins in a plurality of aligned holes in a circle in a stack of laminations comprising, in combination, a central spindle on said machine for carrying said stack of laminations, a box holder for carrying a plurality of pins, transverse divider plates in the bottom of said box holder establishing a plurality of compartments for said pins, a rack having a plurality of semi-cylindrical sockets, means to effectuate movement of said pins out of the bottom of said box holder into said rack sockets, a pinion cooperating with said rack and having a plurality of semi-cylindrical pockets, gearing interconnecting said rack and pinion for equal surface speed, a central longitudinal groove in said rack cutting through the entire depth of said rack sockets, a finger adjacent said pinion and disposed in said groove to move said pins out of said sockets on said rack into said pockets on said pinion as said rack and pinion relatively reciprocate from a retract to an advanced position, said pinion having said pockets on the same bolt circle diameter as the bolt circle diameter of the plurality of holes in said stack of laminations, said pockets being axially alignable with respective holes in said lamination stack, a plurality of long rods axially parallel with said pinion pockets on one axial end of said pinion, a plate adjacent the other axial end of said pinion to retain said pins therein, a plurality of apertures in a circle in said plate, power means to relatively reciprocate said rack and said pinion from a retract position to an advanced position and connected to relatively transversely move said plate and said pinion from a closed to an open position whereat said plate apertures are aligned with said pinion pockets, second power means to axially advance said rods to push said pins out of said pinion pockets into said holes in said stack of laminations, and means to control said second power means to retract said rods.

9. A pinning machine to insert pins in a plurality of aligned holes in a circle in a stack of laminations comprising, in combination, a central spindle on said machine for carrying said stack of laminations, a box holder for carrying a plurality of conductor pins of a predetermined length, transverse divider plates in the bottom of said box holder establishing a plurality of compartments for said pins, an exit slot at the bottom of one side of said box holder, a rack having a plurality of semi-cylindrical sockets, a blade laterally movable in the bottom of said box holder to move said pins laterally out of the bottom of said box holder through said exit slot, a pinion cooperating with said rack and having a plurality of semi-cylindrical pockets, first power means to relatively reciprocate said rack and pinion from a retract position to an advanced position, gearing interconnecting said rack and pinion for equal surface speed and for phase synchronism between said sockets and pockets, a central longitudinal groove in said rack cutting through the entire depth of said rack sockets, a finger adjacent said pinion and disposed in said groove to move said pins out of said sockets on said rack into said pockets on said pinion as said rack and pinion relatively reciprocate, said pinion having said pockets on the same bolt circle diameter as the bolt circle diameter of the plurality of holes in said stack of laminations, said pockets being axially aligned with respective holes in said lamination stack, a plurality of long rods axially alignable with each of said pins in said pockets on said pinion, second power means to axially advance said rods to push said pins out of said pinion pockets into said holes in said stack of laminations, and means to control said second power means to retract said rods.

10. A spinning machine to insert conductor pins in a plurality of holes in a circle with the holes aligned in a stack of laminations comprising, in combination, a central spindle on said machine for carrying said stack of laminations disposed on an axis, a box holder for carrying a plurality of conductor pins of a predetermined length, means for longitudinally reciprocating said box holder to cause alignment of said pins transverse of said box, transverse divider plates in the bottom of said box holder establishing a plurality of compartments for said pins, an exit slot at the bottom of one side of said box holder, a rack having a plurality of semi-cylindrical sockets, a blade laterally movable in the bottom of said box holder to move said pins laterally out of the bottom of said box holder through said exit slot into said rack sockets, a planar wall spaced from said rack sockets to engage said conductor pins and hold them in said sockets, a pinion cooperating with said rack and having a plurality of semi-cylindrical pockets, first power means to reciprocate said rack from a retract position to an advanced position, gearing interconnecting said rack and pinion for equal surface speed as the rack advancingly reciprocates past said pinion pockets, a central longitudinal groove in said rack cutting through the entire depth of said rack sockets, a finger adjacent said pinion and disposed in said groove to move said pins out of said sockets on said rack into said pockets on said pinion as said rack reciprocates past said pinion, said pinion having said pockets on the same bolt circle diameter as the bolt circle diameter of the plurality of holes on the circle in said stack of laminations, said pockets being axially aligned with respective holes in said lamination stack, a plurality of long rods axially aligned with each of said conductor pins in said pockets on said pinion, second power means to axially advance said rods to push said conductor pins out of said pinion pockets into said holes in said stack of laminations, and means to control said second power means to retract said rods.

11. A rotor pinning machine to insert conductor pins in a circular series of aligned holes in a stack of rotor laminations comprising, in combination, an indexing table, a plurality of vertical spindles on said indexing table for carrying a plurality of stacks of rotor laminations with aligned holes at least at a line-up station, a pinning station on said indexing table following said line-up station, said pinning station including a chain conveyor for conveying a plurality of conductor pins of a predetermined length to a box holder, leaf springs carrying said box holder for longitudinal movement, means for longitudinally reciprocating said box holder to cause alignment of said pins transverse of said box, transverse divider plates in the bottom of said box holder establishing a plurality of compartments for said pins, an exit slot at the bottom of one side of said box holder, a dispenser blade laterally movable in the bottom of said box holder to move said pins laterally out of the bottom of said box holder through said exit slot, a curved chute to receive said pins from said exit slot and to guide them from a horizontal position to a vertical position in a single plane, a rack at the lower end of said chute having a plurality of semi-cylindrical sockets receiving said pins from said chute, a planar wall spaced from said rack sockets to engage said conductor pins and hold them in said sockets, a pinion cooperating with said rack and having a plurality of semi-cylindrical pockets, first air cylinder means to reciprocate said rack from a retract position to an advanced position, gearing interconnecting said rack and pinion for equal surface speed as said track advancingly reciprocates past said pinion pockets, a central longitudinal groove in said rack cutting through the entire depth of said rack sockets, a finger adjacent said pinion and disposed in said groove to move said pins out of said sockets on said rack into said pockets on said pinion as said rack reciprocates past said pinion, said pinion having said pockets on the same bolt circle diameter as the bolt circle diameter of the plurality of holes on the circumference of said stack of laminations, said pockets being vertically aligned above respective holes in said lamination stack at said pinning station, a plurality of long rods vertically aligned with each of said conductor pins in said pockets on said pinion, a holding plate underneath said pinion to hold said pins from falling out of said pinion pockets, a plurality of apertures in a circle in said holding plate, second air cylinder means connected to move said holding plate from a closed position to an open position whereat said plate apertures are aligned with said pinion pockets, third air cylinder means vertically reciprocating said rods downwardly to push said conductor pins out of said pinion pockets into said circumferential holes in said stack of rotor laminations at said pinning station, means to control said third air cylinder means to retract said rods, means to control said second air cylinder means to move said holding plate to said closed position underneath said pinion pockets, and means to control indexing movement of said indexing table and consequently of the pinned rotor away from said pinning station and to bring another aligned stack of rotor laminations to said pinning station.

12. A rotor pinning machine to insert conductor pins in a circular series of eighteen aligned holes in a stack of rotor laminations comprising, in combination, an indexing table, a plurality of vertical spindles on said indexing table for carrying a plurality of stacks of rotor laminations with aligned holes at least at a line-up station, a pinning station on said indexing table following said line-up station, said pinning station including a chain conveyor for conveying a pluraliy of conductor pins of a predetermined length to a box holder, leaf springs carrying said box holder for longitudinal movement, means for longitudinally and rapidly reciprocating said box holder to cause alignment of said pins transverse of said box, transverse divider plates in the bottom of said box holder establishing eighteen compartments for said pins, an exit slot at the bottom of one side of said box holder, a dispenser blade laterally movable in the bottom of said box holder to move said pins laterally out of the bottom of said box holder through said exit slot, a curved chute to receive said eighteen pins from said exit slot and to guide them from a horizontal position to a vertical position in a single plane, a rack at the lower end of said chute having eighteen semi-cylindrical sockets receiving said eighteen pins from said chute, a planar wall spaced from said rack sockets to engage the lower portion of said conductor pins and hold them in said sockets, a gauging device positioned above said planar wall and opposite said rack sockets and including eighteen horizontal plungers each aligned in the vertical plane of a respective socket, all said plungers being disposed in a horizontal plane close to the top end of said pins disposed in said sockets, a shoulder on each pin, a gauge plate engaging said shoulders, means to retract said plungers to permit pins falling down said chute to enter said rack sockets, individual springs to urge said plungers toward said rack sockets, a pinion cooperating with said rack and having eighteen semi-cylindrical pockets, first air cylinder means to reciprocate said rack from a retract position to an advanced position, gearing interconnecting said rack and pinion for equal surface speed as said rack advancingly reciprocates past said pinion pockets, a central longitudinal groove in said rack cutting through the entire depth of said rack sockets, a finger adjacent said pinion and disposed in said groove to move said pins out of said sockets on said rack into said pockets on said pinion as said rack reciprocates past said pinion, said pinion having said pockets on the same bolt circle diameter as the bolt cricle diameter of the eighteen holes on the circumference of the said stack of laminations, said pockets being vertically aligned above respective holes in said lamination stack at said pinning station, eighteen long push rods vertically aligned with each of said conductor pins in said pockets on said pinion, a holding plate underneath said pinion to hold said pins from falling out of said pinion pockets, eighteen apertures in a circle in said holding plate, second air cylinder means connected to move said holding plate from a closed position to an open position whereat said plate apertures are aligned with said pinion pockets, third air cylinder means vertically reciprocating said rods downwardly to push said conductor pins out of said pinion pockets into said circumferential holes in said stack of rotor laminations at said pinning station, means to control said third air cylinder means to retract said rods, means to control said second air cylinder means to move said holding plate to said closed position underneath said pinion pockets, and means to control indexing movement of said indexing table and consequently of the pinned rotor away from said pinning station and to bring another aligned stack of rotor laminations to said pinning station.

(References on following page)

References Cited in the file of this patent

UNITED STATES PATENTS

| | | | |
|---|---|---|---|
| 1,758,653 | Cramer | May 13, | 1930 |
| 1,762,017 | Grenzer | June 3, | 1930 |
| 1,817,462 | Phelps | Aug. 4, | 1931 |
| 1,941,992 | Makenny | Jan. 2, | 1934 |
| 1,944,360 | Meyer | Jan. 23, | 1934 |
| 1,996,415 | Guemple | Apr. 2, | 1935 |
| 2,125,970 | Waters | Aug. 9, | 1938 |
| 2,407,016 | Kalister | Sept. 3, | 1946 |
| 2,844,865 | Cook | July 29, | 1958 |